United States Patent
Pearson et al.

(10) Patent No.: US 7,239,690 B2
(45) Date of Patent: Jul. 3, 2007

(54) SYSTEM AND METHOD FOR IDENTIFYING REDIRECTED CALLS

(75) Inventors: Larry B. Pearson, San Antonio, TX (US); Diana Tiliks, Palatine, IL (US); John W. Moss, Lake Zurich, IL (US); Barbara Allyn Vozar, Brunswick, OH (US); Robert Carl Hager, Euclid, OH (US)

(73) Assignee: SBC Knowledge Ventures, L.P., Reno, NV (US)

( * ) Notice: Subject to any disclaimer, the term of this patent is extended or adjusted under 35 U.S.C. 154(b) by 648 days.

(21) Appl. No.: 10/656,928

(22) Filed: Sep. 5, 2003

(65) Prior Publication Data
US 2005/0053219 A1   Mar. 10, 2005

(51) Int. Cl.
H04M 3/42 (2006.01)
H04M 1/00 (2006.01)

(52) U.S. Cl. ............................ 379/207.16; 379/211.01; 379/373.02

(58) Field of Classification Search ........... 379/207.16, 379/211.01, 211.02, 221.08, 373.01, 373.02, 379/911
See application file for complete search history.

(56) References Cited

U.S. PATENT DOCUMENTS

| | | | |
|---|---|---|---|
| 5,353,331 A | 10/1994 | Emery et al. | |
| 5,469,496 A | 11/1995 | Emery et al. | |
| 5,592,541 A * | 1/1997 | Fleischer et al. | 379/211.02 |
| 5,661,791 A * | 8/1997 | Parker | 379/211.02 |
| 5,904,013 A | 5/1999 | Greenspan et al. | |
| 5,926,537 A | 7/1999 | Birze | |
| 5,995,839 A | 11/1999 | Coursey et al. | |
| 6,091,949 A | 7/2000 | Sanchez | |
| 6,130,938 A | 10/2000 | Erb | |
| 6,185,427 B1 | 2/2001 | Krasner et al. | |
| 6,188,888 B1 | 2/2001 | Bartle et al. | |
| 6,208,854 B1 | 3/2001 | Roberts et al. | |
| 6,301,350 B1 | 10/2001 | Henningson et al. | |
| 6,320,534 B1 | 11/2001 | Goss | |
| 6,362,778 B2 | 3/2002 | Neher | |
| 6,373,817 B1 | 4/2002 | Kung et al. | |
| 6,404,858 B1 | 6/2002 | Farris et al. | |
| 6,411,704 B1 | 6/2002 | Pelletier et al. | |
| 6,411,802 B1 | 6/2002 | Cardina et al. | |
| 6,424,840 B1 | 7/2002 | Fitch et al. | |
| 6,480,593 B1 | 11/2002 | Munday et al. | |
| 6,516,060 B1 | 2/2003 | Foladare et al. | |
| 6,574,470 B1 | 6/2003 | Chow et al. | |

(Continued)

OTHER PUBLICATIONS

U.S. Patent Application Publication No. US2002/0198007 A1; to Zimmerman, John; Published Dec. 26, 2002.

(Continued)

Primary Examiner—Bing Q. Bui
(74) Attorney, Agent, or Firm—Toler Schaffer, LLP

(57) ABSTRACT

In a particular embodiment, the disclosure is directed to a system for identifying redirected calls that includes a service switch point and a service control point. The service switch point is coupled to a communications network. The service switch point is configured to receive a call termination request that indicates call redirection. The service control point is coupled to the service switch point and is configured to direct the service switch point to utilize a distinctive ring in response to receiving the call termination request.

23 Claims, 6 Drawing Sheets

U.S. PATENT DOCUMENTS

| | | | |
|---|---|---|---|
| 6,587,475 B1 | 7/2003 | Przygienda | |
| 6,813,346 B2 * | 11/2004 | Gruchala et al. | 379/211.01 |
| 6,823,057 B1 * | 11/2004 | Pershan et al. | 379/211.02 |
| 6,876,730 B1 * | 4/2005 | Woodring | 379/114.28 |
| 7,120,240 B2 * | 10/2006 | Edge et al. | 379/211.02 |

OTHER PUBLICATIONS

Verb Exchange Service - Tagline - One number gets me everywhere; www.verbx.com/srv/service_tagline.html; 1 page.

Zbar, Jeff "Follow-me phone service keeps remote worker tethered to clients, co-workers"; NetworkWorldFusion; www.nwfusion.com/net.worker/columnists/2002/0826zbar.html; 3 pages, Aug. 26, 2002.

www.officescape.com/services.asp; Follow-me phone; 1 page.

Callagenix "call diversion service"; www.callagenix.com/services/diversion.html; 3 pages, Mar. 2003.

Gupta, Puneet, "Short Message Service: What, How and Where?"; Wireless Developer Network; www.wirelessdevnet.com/channels/sms/features/sms.html; 7 pages.

Webopedia; "Short Message Service"; www.webopedia.com/TERM/S/Short_Message_Service.html; 3 pages, Jul. 8, 2003.

"Cellular Phone and Roaming Service"; www.members.tripod.com/peacecraft/infomining/cellphon.htm; 19 pages, Jul. 8, 2003.

* cited by examiner

SYSTEM AND METHOD FOR IDENTIFYING REDIRECTED CALLS

FIELD OF THE DISCLOSURE

This disclosure, in general, relates to systems and methods for identifying redirected calls.

BACKGROUND

As the population becomes more reliant on telecommunications services, more people utilize call-forwarding features to avoid missing calls. Call forwarding can typically be activated to redirect phone calls made to a particular phone to an alternate number. However, when calls are received at the alternate number, there is typically no indication that the call has been redirected.

One might expect that inbound forwarded calls could be identified using caller ID. However, caller ID only provides the original call party number, when available, and not the intermediate phone numbers through which the call has been forwarded. Assuming that the calling party number is available through caller ID, the phone number might be used by the subscriber to determine whether the call was forwarded or dialed directly. However, the determination, in this case, is unreliable. A co-worker may dial the subscriber's office phone after hours just to leave a message. The co-worker would not expect that the call would be answered. In this case, the subscriber might let the call forward to a voice mail service or allow an answering machine to pick up the call. However, what if it were an emergency and the co-worker dialed the subscriber's home number directly? The subscriber might not answer the call, not recognizing the urgency of the inbound call. As such, in these typical systems, the subscriber cannot differentiate direct inbound calls from calls forwarded through another number.

As such, typical call-forwarding systems or features may result in confusion on both the part of the subscriber and originating callers. Therefore, an improved system and method for call redirection would be desirable.

DETAILED DESCRIPTION OF THE DRAWINGS

This disclosure, in general, relates to systems and methods for identifying redirected calls. In one embodiment, a service control point identifies forwarded or redirected calls and a distinctive ring is used to notify the user that the call has been redirected from another phone number.

Figure 1:
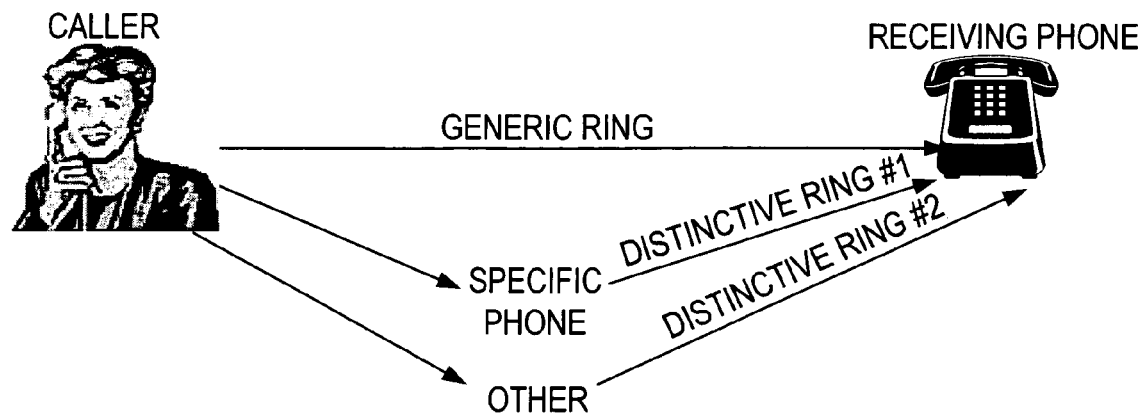
FIG. 1 depicts an exemplary call-forwarding scenario.

FIG. 1 depicts an exemplary embodiment, of a redirected call ring feature. The receiving phone rings when a call is attempted. If the caller calls directly to the receiving phone, the receiving phone may utilize a generic ring. Alternately, if the caller calls a number that redirects the call to the receiving phone, the call may ring with a distinctive ring. In one exemplary embodiment, a specific distinctive ring may be utilized to indicate calls redirected from a specific phone number. In another embodiment, a distinctive ring may be utilized to indicate a redirected call from any phone number or from phone numbers other than the specific phone number.

Figure 2:
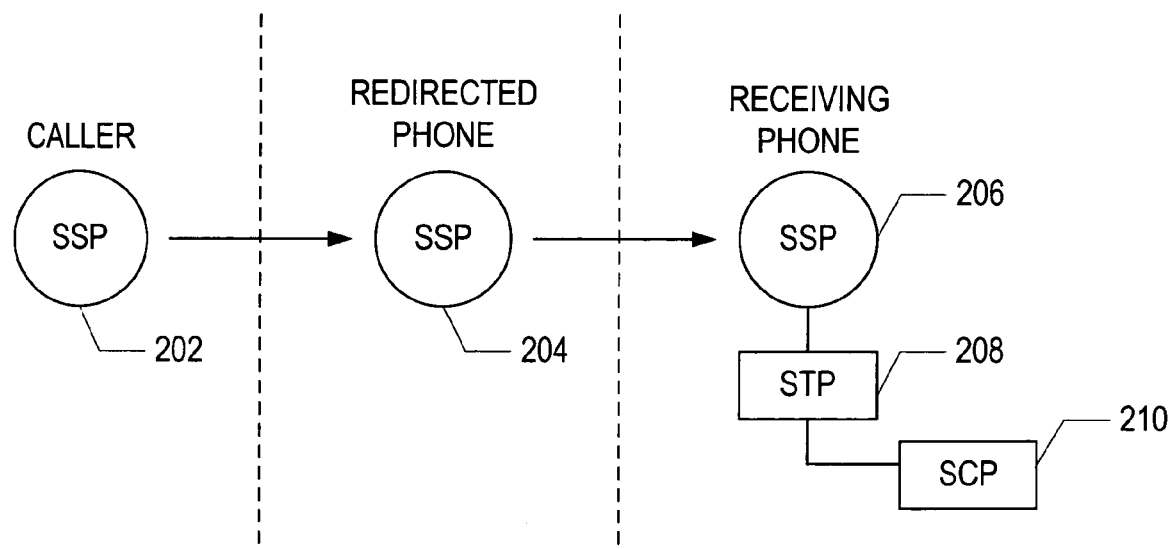
FIG. 2 depicts exemplary calling states provided by an illustrative telecommunications system.

FIG. 2 depicts an exemplary system for implementing a redirected call ring feature. A caller may initiate a phone call at service switch point 202. The service switch point 202 may send a call termination attempt message to the call address associated with a service switch point 204. The service switch point (SSP) 204, may determine that a call-forwarding feature is activated for the called address. For example, the SSP 204 may access a service control point (not shown) to determine that call forwarding has been activated for the called address and to determine an alternate phone number or network address to which the call is to be forwarded. The SSP 204 may then send a call termination attempt message to an SSP 206 associated with the alternate phone number or network address to which the call is to be forwarded.

The SSP 206 may make a query to a service control point (SCP) 210 via a signal transfer point (STP) 208. The STP 208 may be used to route messages between the SSP 206 and SCP 210. The STP 208 routes messages between networking elements. The SSP 206 may query the SCP 210 upon receiving a call termination attempt message to check for call features such as voicemail, call-forwarding, and other telephone service related features. The call termination attempt message and the query associated with the call termination attempt may include a caller's network address, the receiving phone network address and if the call has been redirected, the phone network address through which the call was redirected (redirected phone address). The SCP 210 receives the query and determines whether the call has been redirected. If the call has been redirected and a redirected call ring feature is active for the receiving phone network address, the SCP 210 may direct the SSP 206 to utilize a distinctive ring, indicating that the call has been redirected. If the call has not been redirected, and is dialed direct to the receiving phone or if the redirected call ring feature is not active, the call may be initialized utilizing a generic ring.

A distinctive ring may be a ring pattern or musical score played through a telephone or communication device that differs from the ring pattern typically used to indicate an incoming call. The ring pattern typically used to indicate an incoming call is the generic ring. In one embodiment, the distinctive ring may be a ring pattern that is faster or slower than the generic ring pattern. In another embodiment, the distinctive ring may use a mixed tempo pattern or a musical score. In an exemplary embodiment of the SCP 210, a user may create a pattern, select a pattern from a list, or download a desired pattern.

In another embodiment, the SCP 210 may compare the redirected phone network address to a specific network address. If the redirected network address matches the specific address, a specific distinctive ring may be utilized to indicate that the call has been redirected from the specific network address. The SCP 210 may also utilize a second distinctive ring to indicate that a call has been redirected from network addresses other than the specific address.

The SSPs 202, 204 and 206, and the SCP 210 may reside in a network. In one exemplary embodiment, the network may be a public switched telephone network (PSTN) utilizing an SS7 protocol. In an alternate embodiment, the network may also be a voice over internet protocol (IP) based network. The SSP and SS7 exemplary embodiment relates to an Advanced Intelligent Network (AIN). However, the system may also be implemented as a data switch or Private Branch Exchange (PBX) based feature.

Figure 3:
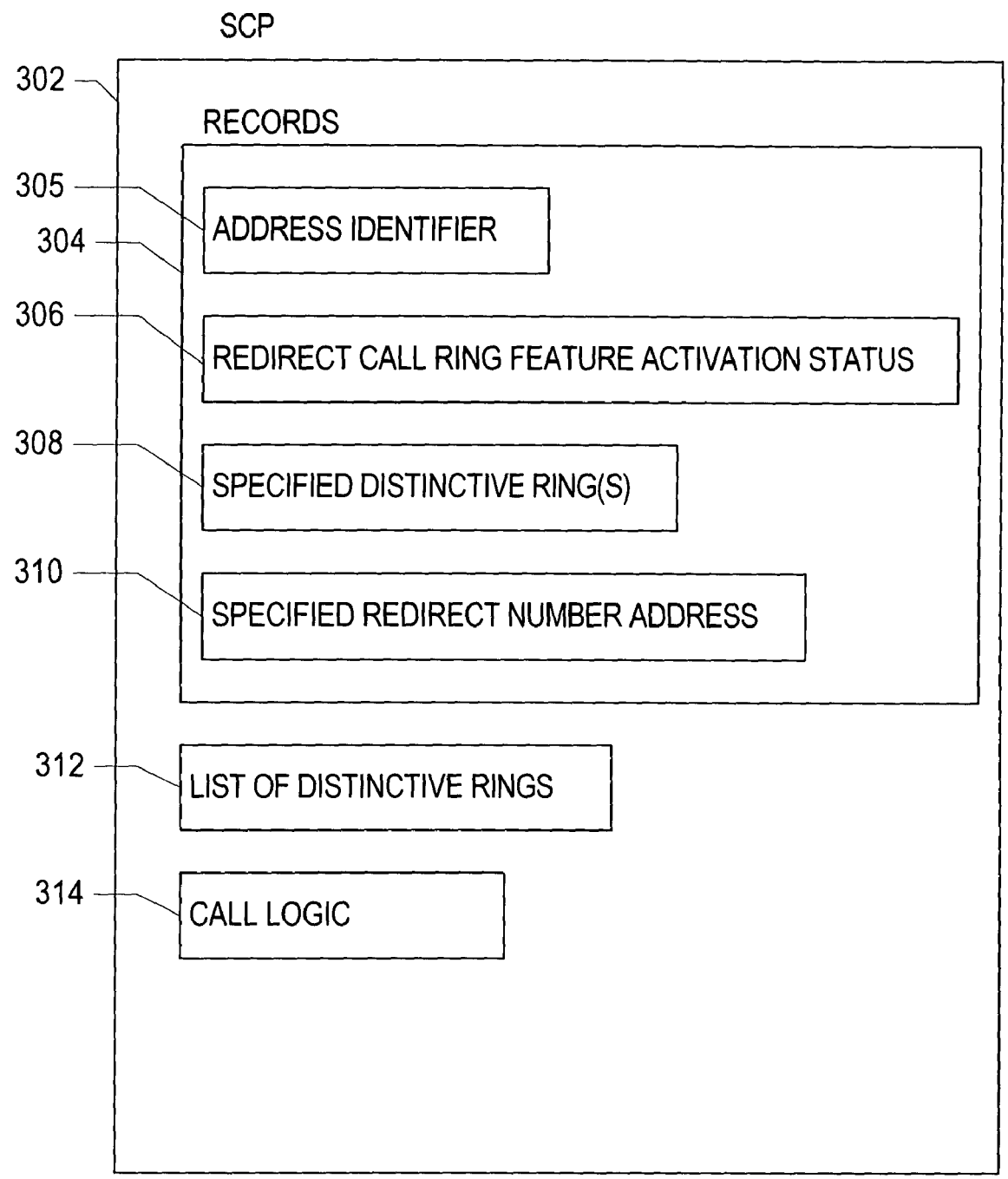
FIG. 3 depicts an exemplary service control point (SCP).

FIG. 3 depicts an exemplary service control point 302. The service control point (SCP) 302 includes data records 304 and computer logic 314. The SCP 302 may also include a list of available distinctive rings 312.

The records 304 may each include an address identifier field 305 and a field for indicating the activation status of a redirect call ring feature 306. The address identifier 305 indicates a network address associated with the record. The activation status 306 indicates whether functions associated with the redirect call ring feature are to be applied to calls directed to the network address associated with the address identifier 305.

In one exemplary embodiment, the record 304 may also include one or more specified distinctive rings 308. These specified distinctive rings 308 may be specified by a user and indicate which ring out of the list of distinctive rings 312 is to be used. The distinctive ring field 308 may also associate a distinctive ring with a specific redirected number address. In one exemplary embodiment, a user may specify a specific redirect number network address 310 and associate with that specific redirect number address 310 a specific distinctive ring 308. If a call from the specified redirect number network address 310 is received, the SCP 302 may direct the use of the specific distinctive ring 308 to the receiving subscriber communications devices. In addition, the user may specify another distinctive ring for use with numbers or calls redirected from numbers other than the specified redirect number address 310.

The SCP 302 may also include logic 314. Logic 314 may comprise software, hardware, or a combination of software and hardware. Logic 314 may act to receive call termination attempt queries and may perform various functions associated with features activated for the network address to which the call attempt is being made. Also, if the redirect call ring feature is active, the logic 314 may initiate distinctive rings for redirected calls.

For example, the logic 314 may access a record 304 having address identifier 305 associated with a network address to which a call attempt is being made. The logic 314 may test the record 304 to determine if the redirect call ring feature is active. The logic 314 may determine whether the query associated with the call attempt includes a redirect network address. If the query includes a redirect network address, the logic 314 may initiate a call using the specified distinctive ring 308. In an alternate embodiment, the logic 314 may compare the redirect network address to the specified redirect number network address 310 and selectively direct the utilization of the specified distinctive ring 308 based on the value of the redirect network address.

The logic 314 of the SCP 302 may also enable user interaction to manipulate values associated with the redirect call ring feature. For example, the logic 314 may permit a user to select a specified distinctive ring 308 from the list of distinctive rings 312. In an alternate embodiment, the logic 314 may permit the user to specify the specified redirect number address 310 and associate a specific distinctive ring with that specified redirect number address 310. In various embodiments, the logic 304 may permit interaction with the records through pound sign (#) command functions, network messages, or Internet based interactions such as through email or a web page.

Figure 4:
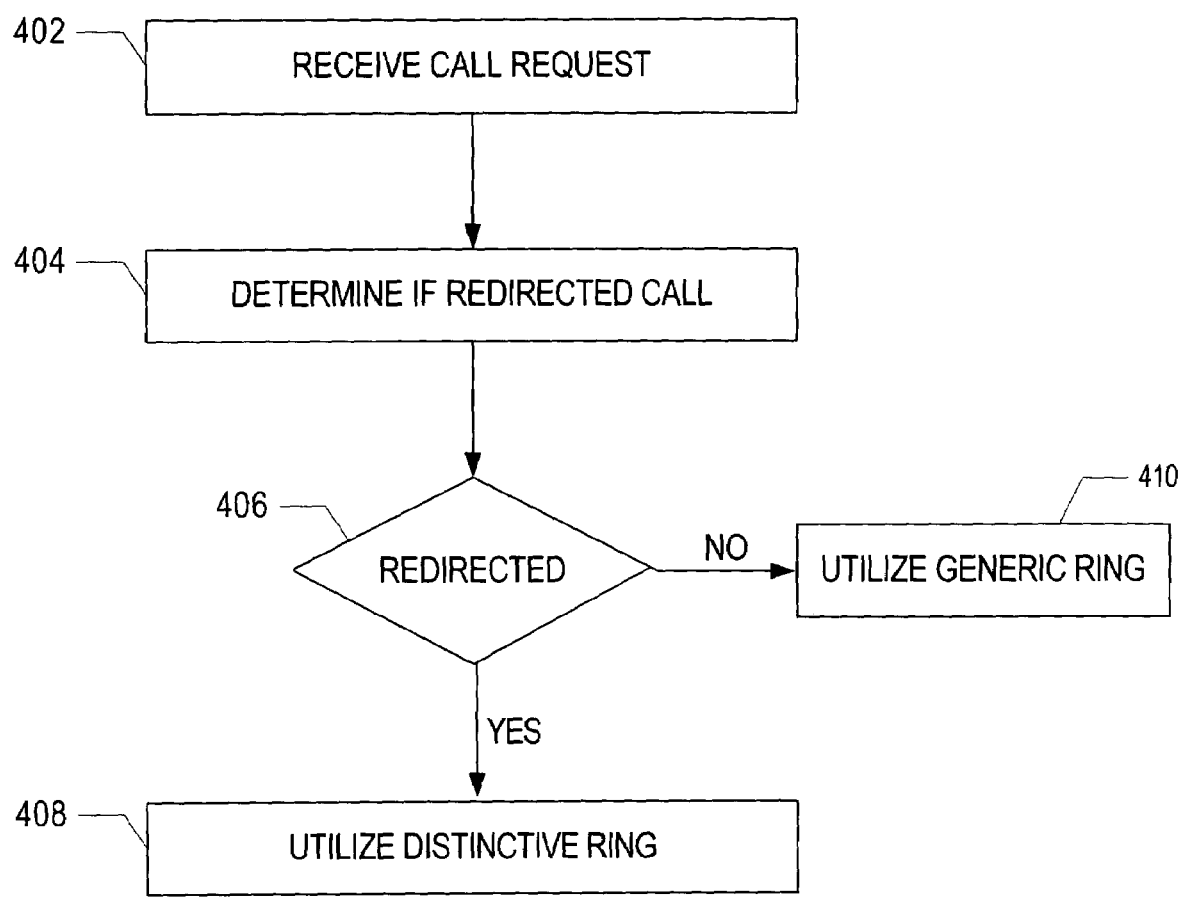
FIGS. 4, 5, 6 and 7 depict exemplary methods for indicating a forwarded call.

FIG. 4 depicts an exemplary method for indicating that a call has been redirected. A call request, call termination attempt, message, or call termination attempt query may be received by a system, as shown at step 402. The system may determine if the call is a redirected call, as shown as step 404. In one exemplary embodiment, the call request or query may be tested for a redirected network address, indicating that the call attempt has been redirected. As shown at step 406, if the call has been redirected, the system may direct the utilization of a distinctive ring to initiate a call, as shown at step 408. However, if the call has not been redirected, the system may direct the utilization of a generic ring, as shown at step 410.

Figure 5:
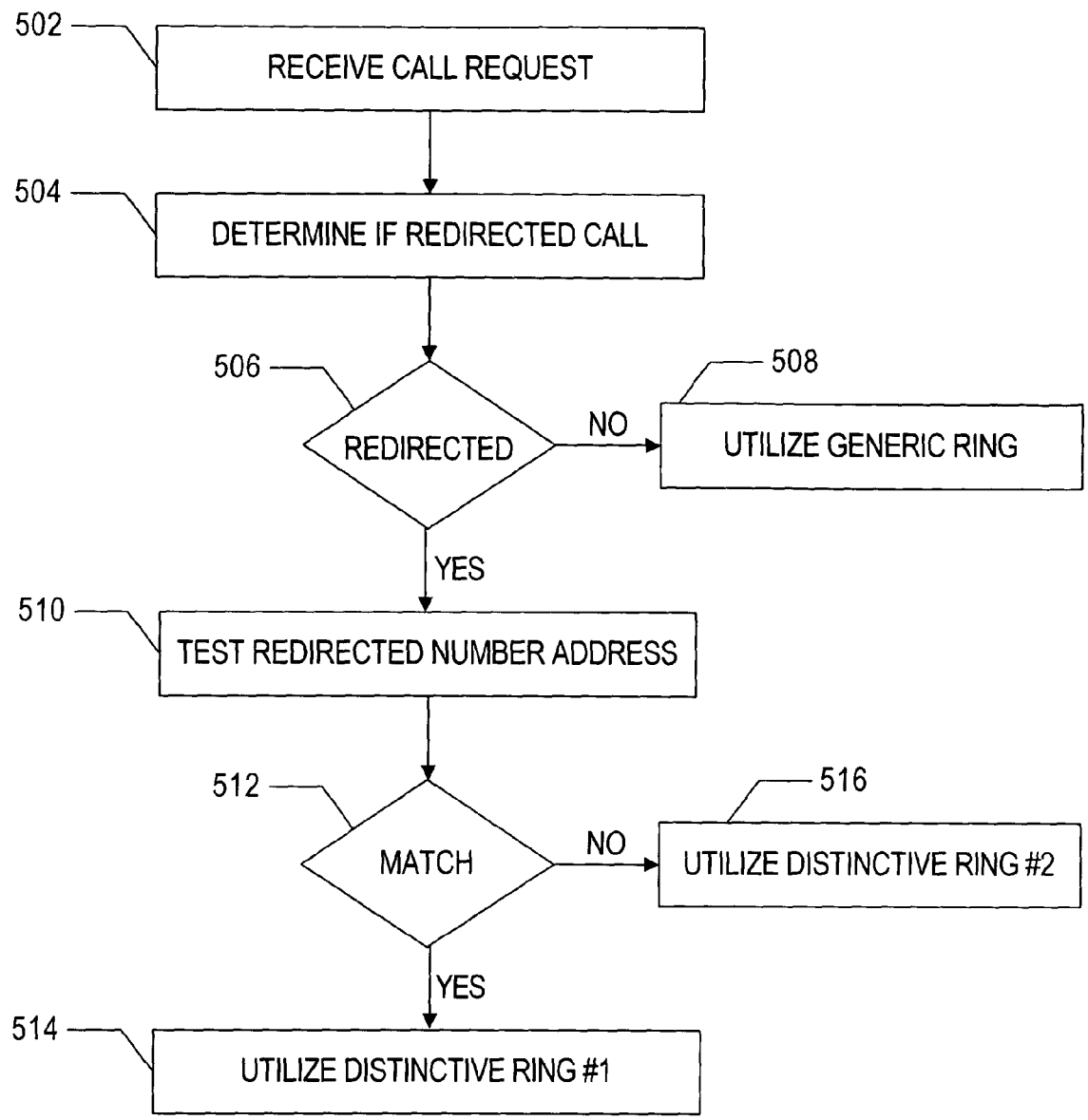

FIG. 5 depicts an alternate embodiment of a method for indicating that a call has been redirected. The system may receive a call request, call termination attempt or call termination attempt query, as shown at step 502. The system may then determine if the call attempt is a redirected call, as shown at step 504. For example, the system may test the request or query to determine if a redirect network address is included in the request or query. If the call has not been redirected, as indicated by step 506, the system may direct the utilization of a generic ring, as shown at step 508.

However, if the call is a redirected call the system may test to determine the redirected number address, as shown at step 510. This may, for example, include parsing a call request or call query. The system may test to determine if the redirected number address matches a specified redirect number address, as shown at step 512. If the redirect number address does not match a specified redirect number address, the system may direct the utilization of a distinctive ring number 2, as shown at step 516. However, if the redirect number address matches a specified network address, the system may direct the utilization of a distinctive ring number 1, as indicated by step 514.

Figure 6:
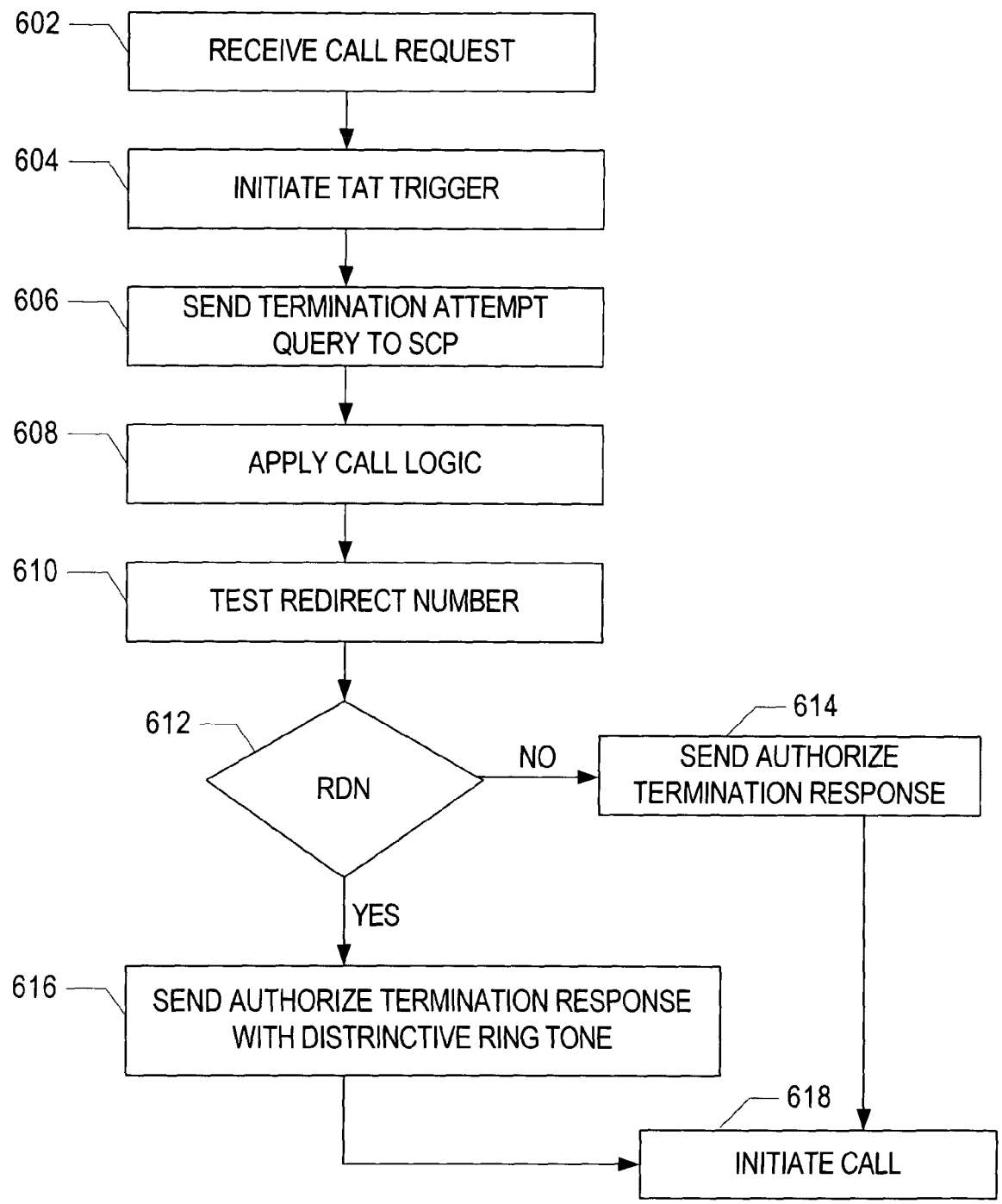

FIG. 6 depicts a further exemplary embodiment of a method for indicating that a call has been redirected. In this exemplary embodiment, an SSP may receive a call termination attempt, as shown at step 602. The SSP may initiate a termination attempt trigger, as shown at step 604, and send a termination attempt query to a SCP, as shown at step 606. The SCP may apply call logic in response to receiving the termination attempt query, as shown at step 608. For example, the SCP may determine whether call forwarding has been activated for a network address associated with the termination attempt. The SCP may also determine whether a redirect call ring feature is activated for the network address associated with the termination attempt. The termination attempt query may, for example, include a call initiating network address, a destination network address, and a redirected network address. The SCP may test the call termination attempt query for the redirect number address, as shown at step 610. The SCP may make a decision based on the presence of a redirect number address (RDN), as shown at step 612. If the call termination attempt query does not include a redirect number address, the SCP may send an authorization termination response, as shown at step 614. This authorization termination response may result in the use of a generic ring when initiating a call to a destination device.

However, if a redirect number address is present, the system may send an authorized termination response including direction to use a distinctive ring tone, as shown at step 616. This authorization termination response will result in the use of the distinctive ring when initiating the call, as shown in step 618.

Figure 7:
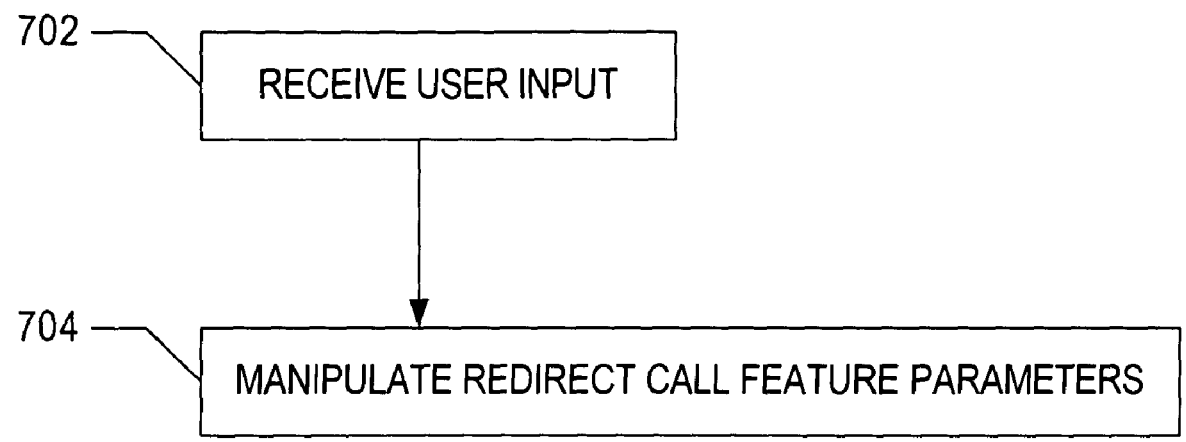

FIG. 7 depicts an exemplary method for establishing a redirect call ring feature. The method includes receiving a user input, as shown at step 702, and manipulating the redirect call ring feature parameters, as shown at step 704. The user input may, for example, be received through pound (#) commands and commands entered via a telephone connected to a PSTN. Alternately, the user input may be received via other electronic means such as a short message service (SMS) system, web page, or email. The system may permit the manipulation of various parameters associated with the redirect call ring feature. These parameters may, for example, include activation or deactivation of the redirect call ring feature, selection of a specific distinctive ring, association of a specific redirect network address with a specific distinctive ring and modifications of these associations.

In a particular embodiment, the disclosure is directed to a system for identifying redirected calls that includes a service switch point and a service control point. The service switch point is coupled to a communications network. The service switch point is configured to receive a call termination request that indicates call redirection. The service control point is coupled to the service switch point and is configured to direct the service switch point to utilize a distinctive ring in response to receiving the call termination request.

In another embodiment, the disclosure is directed to a method of call identification. The method includes receiving a call termination request, determining whether the call termination request indicates a redirected call, and selectively directing the utilization of a distinctive ring when initiating a call based on a determination as to whether the call termination request indicates a redirected call. The call termination request includes a destination address and is configured to request initiation of a call to the destination address.

In a further embodiment, the disclosure is directed to a service control point that includes computer-readable storage, a data record stored in the computer readable storage, and logic. The data record is associated with a telephone network address and is configured to indicate activation status of a redirect call ring feature. The logic is configured to access the data record in response to receiving a call termination query. The logic is configured to determine whether the call termination query indicates a redirected call. The logic is also configured to selectively direct utilization of the redirected call ring feature based on the activation status.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system for identifying redirected calls, the system comprising:
    a service switch point coupled to a communications network, the service switch point configured to receive a call termination request, the call termination request indicating call redirection; and
    a service control point coupled to the service switch point, the service control point configured to direct the service switch point to utilize a first distinctive ring in response to receiving the call termination request when a redirect number address does not match a specified redirect number address and to utilize a second distinctive ring when the redirect number address matches the specified redirect number address.

2. The system of claim 1, wherein the service switch point is configured to receive a second call termination request, the service switch point configured to utilize a generic ring in response to receiving the second call termination request.

3. The system of claim 1, wherein the call termination request includes a redirected number address and wherein the service control point is configured to selectively direct the service switch point to utilize a specific distinctive ring when the redirected number address matches a specific address.

4. The system of claim 3, further comprising a signal transfer point coupled to the service switch point and coupled to the service control point, the signal transfer point configured to route messages associated with the call termination request between the service switch point and the service control point.

5. The system of claim 1, wherein the communications network is an SS7 compatible network.

6. The system of claim 1, wherein the service control point comprises computer-readable storage, the computer readable storage configured to store a data record associated with a network address associated with the call termination request, the data record including an activation status of a redirected call distinctive ring feature.

7. A method of call identification, the method comprising:
    receiving a call termination request at a service control point (SCP), the call termination request including a destination address, the call termination request configured to request initiation of a call to the destination address;
    determining whether the call termination request indicates a redirected call; and
    selectively directing the utilization of a first distinctive ring when a redirect number address does not match a specified redirect number address and directing the utilization of a second distinctive ring when the redirect number address matches the specified redirect number address when initiating a call to the destination address.

8. The method of claim 7, further comprising determining whether the call termination request includes a redirect number address.

9. The method of claim 7, further comprising determining whether the call termination request includes a specific redirect number address.

10. The method of claim 9, wherein the distinctive ring is a specific distinctive ring associated with the specific redirect number address.

11. The method of claim 7, further comprising receiving a user input associating a specific distinctive ring with a specific redirect number address.

12. The method of claim 7, further comprising accessing a service control point in response to receiving a call termination request and determining whether a redirected call ring feature is active.

13. The method of claim 7, wherein the call termination request is associated with an SS7 protocol.

14. A service control point comprising:
    computer-readable storage;
    a data record stored in the computer-readable storage, the data record associated with a network address, the data record configured to indicate an activation status of a redirected call ring feature and including a specific redirect number address; and
    logic configured to access the data record in response to receiving a call termination query, the logic configured to determine whether the call termination query indicates a redirected call and wherein the logic is configured to selectively direct utilization of the redirected call ring feature based on the activation status and based on a comparison of the specific redirect number address with a redirect number address included in the call termination query.

15. The service control point of claim 14, wherein the call termination query is associated with an SS7 protocol.

16. The service control point of claim 14, wherein the logic is configured to communicate with a service switch point.

17. The service control point of claim 16, wherein the logic is configured to selectively direct the service switch point to utilize a distinctive ring.

18. The service control point of claim 16, wherein the logic is configured to selectively direct the service switch point to utilize a first distinctive ring in response to the call termination query indicating a specific redirect number address and a second distinctive ring in response to the call termination query indicating a redirect number address other than the specific redirect number address.

19. The service control point of claim 14, wherein the logic is configured to receive user input identifying a specific distinctive ring, the logic configured to store the specific distinctive ring in the data record.

20. The service control point of claim 14, wherein the logic is configured to receive user input indicating a specific redirect number address, the logic configured to store the specific redirect number address in the data record.

21. The service control point of claim 14, wherein the logic is configured to receive user input and is configured to manipulate data stored within the data record that is associated with the redirected call ring feature.

22. The service control point of claim 14, wherein the logic is configured to receive user input associating a specific redirect number address with a specific distinctive ring.

23. The service control point of claim 14, wherein the logic is configured to selectively direct the utilization of a first distinctive ring when a redirect number address matches the specific redirect number address and direct the utilization of a second distinctive ring when the redirect number address does not match the specific redirect number address.

* * * * *